(12) United States Patent
Yakoub et al.

(10) Patent No.: US 8,950,127 B2
(45) Date of Patent: Feb. 10, 2015

(54) WIND ENERGY TURBINE SHELL STATION

(71) Applicant: Haisam Yakoub, Gloucester (CA)

(72) Inventors: Haisam Yakoub, Gloucester (CA);
Rima Ghusen, Gloucester (CA)

(*) Notice: Subject to any disclaimer, the term of this patent is extended or adjusted under 35 U.S.C. 154(b) by 0 days.

(21) Appl. No.: 14/115,349

(22) PCT Filed: Oct. 9, 2012

(86) PCT No.: PCT/CA2012/000934
§ 371 (c)(1),
(2) Date: Nov. 2, 2013

(87) PCT Pub. No.: WO2013/063681
PCT Pub. Date: May 10, 2013

(65) Prior Publication Data
US 2014/0083027 A1    Mar. 27, 2014

Related U.S. Application Data

(63) Continuation of application No. 13/462,811, filed on May 2, 2012.

(30) Foreign Application Priority Data

Oct. 11, 2011  (CA) ..................................... 2755849
Oct. 9, 2012  (CA) ..................................... 2792693

(51) Int. Cl.
*E04D 13/18*  (2014.01)
*E04H 5/02*  (2006.01)
(Continued)

(52) U.S. Cl.
CPC .. *E04H 5/02* (2013.01); *F03D 9/02* (2013.01);
*F03D 3/02* (2013.01); *E04H 12/00* (2013.01);
*Y02B 10/30* (2013.01); *Y02E 10/74* (2013.01);
*Y02E 70/10* (2013.01); *Y02E 70/20* (2013.01);
*F05B 2220/61* (2013.01);
(Continued)

(58) Field of Classification Search
USPC .............. 52/173.1, 1, 234, 236.3, 302.1, 750;
415/4.1, 4.2, 4.3, 4.4, 4.5, 62; 416/120,
416/124, 175, 204 R; 60/398; 290/54, 55,
290/43, 44
See application file for complete search history.

(56) References Cited

U.S. PATENT DOCUMENTS 1,045,459 A * 11/1912  Todd .............................. 138/149
2,169,165 A *  8/1939  Reedy .............................. 416/9
(Continued)

*Primary Examiner* — Joshua J Michener
*Assistant Examiner* — Matthew Gitlin

(57) ABSTRACT

A wind turbine station for generating electricity comprising a multi floor structure having open framing. The open framing comprising at least two spaced-apart, open, vertical frames, the frames each made primarily of uncovered beams and columns. The station has a plurality of vertically spaced, horizontal, interior platforms forming the floors of the structure, each interior platform extending between and joined to both of the frames over the length of the frames. Wind turbines are mounted on the structure about the outer periphery of each platform. The wind turbines face outwardly and are each operatively connected to a generator to produce electricity. In a preferred embodiment, the structure has an annular shape with an outer cylindrical or polygonal prism frame and an inner cylindrical or polygonal prism frame spaced from the outer frame. The interior platforms have a flat, ring shape. The invention includes a method for building the station.

23 Claims, 14 Drawing Sheets

(51) Int. Cl.
  *F03D 9/02* (2006.01)
  *F03D 3/02* (2006.01)
  *E04H 12/00* (2006.01)
(52) U.S. Cl.
  CPC .. *F05B 2240/211* (2013.01); *F05B 2240/2212* (2013.01); *F05B 2240/40* (2013.01)
  USPC ............... 52/173.1; 52/1; 52/234; 52/750; 415/4.1; 415/62; 416/124; 416/204 R; 60/398; 290/54

(56) References Cited

U.S. PATENT DOCUMENTS

| | | | |
|---|---|---|---|
| 3,936,652 A * | 2/1976 | Levine | 290/2 |
| 4,134,707 A * | 1/1979 | Ewers | 415/4.2 |
| 5,146,096 A * | 9/1992 | McConachy | 290/44 |
| 5,429,480 A * | 7/1995 | Van Der Veken | 416/120 |
| 5,982,046 A * | 11/1999 | Minh | 290/55 |
| 6,647,717 B2 * | 11/2003 | Zaslavsky et al. | 60/398 |
| 6,749,399 B2 * | 6/2004 | Heronemus | 416/41 |
| 7,215,036 B1 * | 5/2007 | Gehring | 290/54 |
| 7,352,078 B2 * | 4/2008 | Gehring | 290/54 |
| 7,804,186 B2 * | 9/2010 | Freda | 290/55 |
| 8,727,698 B1 * | 5/2014 | Pickett et al. | 415/1 |
| 2002/0148222 A1 * | 10/2002 | Zaslavsky et al. | 60/398 |
| 2005/0248162 A1 * | 11/2005 | Krouse | 290/54 |
| 2006/0232075 A1 * | 10/2006 | Fraenkel | 290/54 |
| 2009/0238676 A1 * | 9/2009 | Marvin | 415/4.3 |
| 2010/0296928 A1 * | 11/2010 | Falcone et al. | 416/120 |
| 2013/0214539 A1 * | 8/2013 | Freda | 290/55 |
| 2013/0313831 A1 * | 11/2013 | Gehring | 290/54 |

* cited by examiner

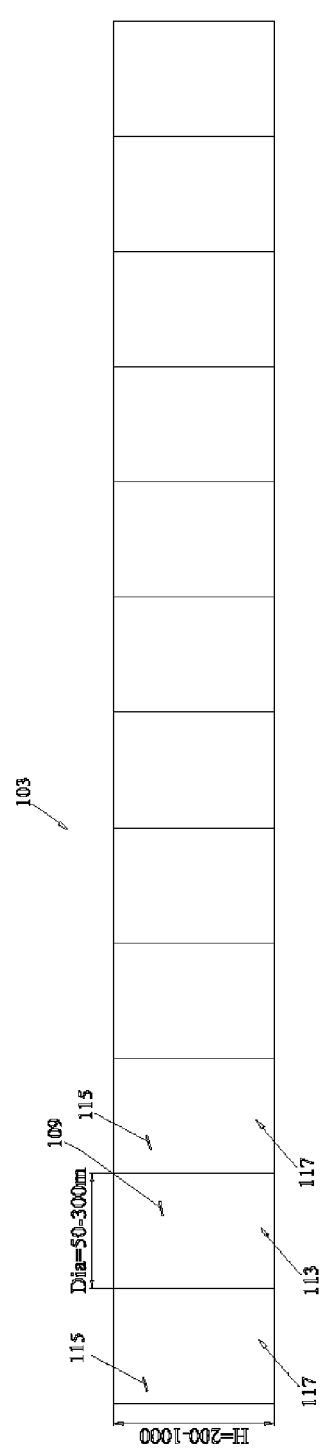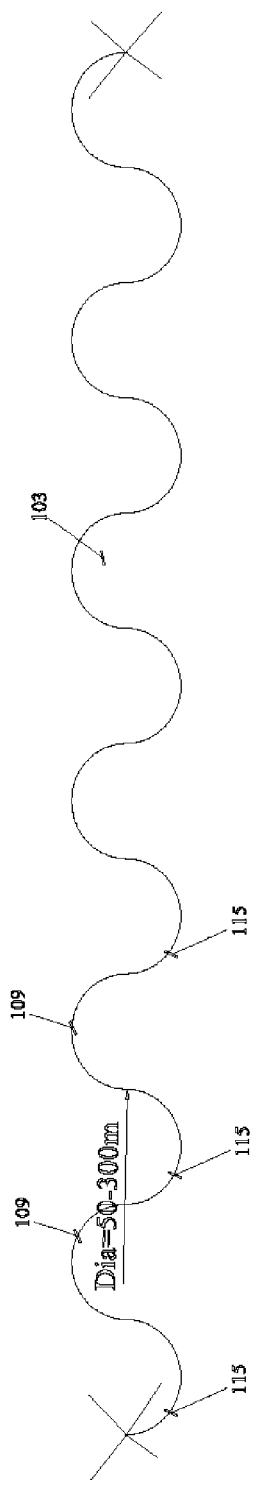
Fig.13.
Fig.14.

WIND ENERGY TURBINE SHELL STATION

BACKGROUND OF THE INVENTION

1. Technical Field

The invention relates to a wind turbine station. The invention is more particularly directed toward a wind turbine station having an open frame, multi-story structure with many turbines on each floor using wind energy to produce electricity.

2. Background Art

Wind energy has been used for a long time since the 1200s in Europe, where it was used in mills to grind grain between millstones, then was used as drainage windmills by Dutch, oil mills to press oil from seeds, paint mills, hulling mills, and glue mills. The end of $20^{th}$ century and the beginning of $21^{st}$ century brought important advancement to wind turbines and wind becomes a possible energy source, an alternative to fossil fuel.

Sun radiation incident on the earth every year is $5.6 \times 10^{24}$ J. Sun energy is dispersed in atmosphere layers and on the earth's surface where it warms the air and generates wind. Primary energy use for the whole world is estimated at about 500 EJ that requires 16 TW capacity generators. The total consumed energy is less than 0.01% from the solar radiation captured in the Earth's atmosphere and surface, and about 0.2% of kinematical energy in wind. That means wind is a vast source of alternative, sustainable and clean energy.

Current state of the art comprises giant wind turbines that have three foil blades operate on an approximately 100-125 m high hub, where they rotate in the foil vertical plane. These giant or utility turbines have a maximum energy output that is reached when the wind speed is 10 to 14 m/s and maintain this maximum energy output until reaching a cut-out speed of 25-40 m/sec.

Current state of the art utility wind turbines use giant turbines which have approximately 1 MW average generated electrical capacity, throughout the year. However, the inherent disadvantages of utility wind turbines, prevent the current technology from being a feasible alternative to fossil fuel, nuclear and other conventional energies. The current state of the art wind turbines have many drawbacks.

Current wind turbines take up too large land areas in wind farms where land between turbines is deemed, usually, to be non-useful because of noise and shade flickers associated with operating large wind turbines. The space required by utility wind turbine averages between 8.5-33 hectare/MW, in Europe and The USA respectively where the output of fluctuating electricity is assumed to be completely useful as it's mixed with fossil fuel based electricity. Current state of the art wind turbines generate noise which is detrimental to human health within approximately 2 km from the turbines (Wind Turbine Syndrome). Wind Turbine Syndrome causes people living in the vicinity of 2 Km of wind farms to have headaches, loss of memory and other illnesses because of vibration and low-frequency noise. Current state of the art large wind turbines kill bird and bats.

Current state of the art wind turbines provide electricity voltage, frequency, current and output which fluctuate all the time as a normal result of wind speed variation over time and it's not feasible to store the energy in a chemical media and then regenerate the electricity consistent with demand, because the cost of electricity would have increased 4 times more than the present cost of wind electricity which is already too high.

According to EON Energy company in Germany, the current state of the art wind turbines generate electricity which has 4% capacity credit, (or firm capacity which is a fraction of wind installed capacity and which is in the grid or available all the time) when grid penetration (percentage of wind electricity in the grid) is 49 GW in the German grid. In other words, the 49 GW installed capacity wind turbines are able to displace only 2 GW of fossil fuel generators. That because of fluctuation in wind speed, then in the turbine output.

PRIOR ART

There is no prior art close to this invention.

SUMMARY OF THE INVENTION

The wind turbine station is a multi-floor structure having open framing By 'open framing' it is meant a structure having posts or columns and beams which define the shape of the structure without having walls closing in the structure. The structure preferably is an annulus-shaped tower having a central vertical axis, the tower defining radially disposed, at least, inner and outer frames made primarily of beams and columns. The tower has a plurality of vertically spaced horizontal interior platforms extending between beams of said inner and outer frames over the length of the frames, the interior platforms forming the floors in the structure. Exterior platforms extend outwardly from each interior platform with a turbine on each exterior platform. Wind turbines are mounted at each interior platform about the outer periphery of the platform, the turbines facing outwardly. Each wind turbine is operatively connected to a generator to produce electricity. The tower may reach a height of 1000-2000 m and has a close or open ring-shaped horizontal cross section. The tower, preferably, has a ring shape in a horizontal cross-section which has outer and inner circular peripheries. The outer and inner peripheries, in cross-section, can also be square, polygon such as hexagon, octagon, or the like. Every floor in the multi floor structure is typically an interior platform in the form of a horizontal, flat, ring 8-25 m wide which defines the perimeter of the tower. Every interior platform is connected to adjacent top and bottom level interior platforms by means of ramps which are adjacent to the inner frame of the tower structure in the close horizontal cross-section structure and about the middle distance between the inner and outer frames in the open horizontal cross section structure. The ramps are about 4 m wide. Each story has a typical height of about 10 m. Typical diameter or width of the tower structure is 125-500 m, typical height 500-2000 m, and typical number of levels is 50-200 stories. The height to width ratio of the tower is normally about 4. The higher the seismic forces in a region of the wind station, the less height to diameter ratio.

Every few floors may be served by a truck mounted crane with an accompanying team of service and maintenance personnel, around 3-5 people in every shift, who perform continuous maintenance of the turbines on their floors. The whole structure might be served by about four elevators, two to carry people and two or more to carry equipment and wind turbines to the required floors. Washrooms are built on each floor under the ramps, one washroom under each ramp. All equipment for generating hydrogen, storing it, and generating electricity from it, might be installed on the ground floor of the structure. Additional space can be added to accommodate required hydrogen tanks and other equipment needed to generate hydrogen, store it safely and reuse it in fuel cells.

Wind turbines are installed and distributed about the outer frame perimeter of each floor of said multi-floor framing or on exterior platforms, one turbine on a platform. The exterior platforms protrude intermittently or continuously outside the outer frame all around the outer perimeter of each interior platform. The tower frames are built typically from high yield structural steel, while the platforms are made from light steel floor sheets or other light, stiff and strong materials, and installed on primary and secondary beams made of moderate to high yield steel. The wind turbine station typically averages an annual output capacity of 50-1000 MW regular electricity and 175-3,750 MW of fluctuating electricity, at 6 m/sec average annual wind speed.

The frame structure supports pluralities of individual Horizontal Axis Wind Turbines (HAWT), Vertical Axis Wind Turbines (VAWT) or a combination thereof, where said individual wind turbines harvest wind energy and generate electricity by the electricity generators connected thereto. Generally, in an annulus section tower structure, one half of the installed wind turbines which face wind, rotate to generate electricity, while the other half, on the leeward side are stationary and inoperable. Each turbine is almost equal in size to the length of the gaps between columns in the exterior frames and to the height between two adjacent interior platforms or floors.

The electricity generated may be supplied directly to a grid after transformation to current and voltage compatible with the grid. Preferably however, the electricity generated is used to generate hydrogen that chemically stores a large part of the harvested energy temporarily, by using the required equipments such as known transformers, water supply, electrolyzers, pumps and hydrogen tanks on the ground floor. Hydrogen is stored in highly pressurized or liquefied form in tanks on the ground floor, and then the stored hydrogen volumes are used in fuel cells. Fuel cell capacity is calculated by multiplying the average annual fluctuating electricity generated by the wind turbine station, by electrolysis efficiency which is approx. 0.61 and by the fuel cell efficiency which is approx. 0.41. Fuel cells regenerate electricity with regular characteristics of current, frequency and potential and then the regular characteristic electricity is fed to a grid after it has undergone transformation to compatible voltage and current of the grid by using sufficient transformers, generally on the ground floor level. The average possible output obtained is proportional to annual average wind speed in a region. To speed up the electrolysis process and avoid wasting of energy, supplied potential to electrolyzers should be around known 2.06 v. Supplied current is known to be high. Current might range between 100,000-1000,000 amperes. Highly fluctuating generated electricity by the wind turbines may be stored in other chemical means and restored later on demand.

Operating wind speed range of the turbines in the wind turbine station for known small HAWT or VAWT is about 3-175 m/s. Generating electricity for electrolizers provides for lower cost and more durable generators, because there is no need for constant frequency. Then there is no need for high speed gears, or for gears all together.

Maintenance of the wind turbine station is an important feature of the present invention. The construction and size of the turbine station allows continuous ongoing maintenance of the station. The continuous maintenance of the wind turbines is possible because accessibility to any wind turbine is always possible, easy and fast. Continuous maintenance leads that most of the windward turbines, operate all the time. That is, because the maintenance staff, continuously, observe the turbines using monitors and computers on each interior platform. Monitors tell when any turbine needs maintenance, while all other wind turbines are operating. Most probably 99.33% of turbines will be operating the whole year around, assuming every single turbine is maintained once a year which is considered reasonable and little conservative because the industry of wind turbines is very advanced. As a result, the average of annual operation hours for each turbine is 0.9933×8760=8701 hours/year. In cost analysis, the total number of all turbines is considered. In energy calculation, only half the number of the turbines is considered because only half number of the wind turbines work at a time.

Wind turbine station is the first fixed structure capable of reaching unprecedented heights up to approximately 2000 m and the first structure to harvest wind energy continuously at high altitudes over 200 m above the ground surface and on large scale. Wind turbine station has output for a unit area of wind turbines is several times higher than current large wind turbines in 6 m/sec wind speed environment and becomes tenths of times higher with higher wind speeds.

Wind turbine station is normally constructed using conventional steel has yield stress up to 600-700 MPa. Wind turbine station requires only about 0.2% of average land required for large wind turbines of similar capacities. Required space for fluctuating electricity of wind turbine stations ranges between 0.03-0.04 hectare/MW, and the required space for regular electricity, and proportional with demand, is 0.10-0.15 hectare/MW. Noise generated by small HAWT and VAWT in the wind turbine station is much lower than noise generated by utility wind turbines because tip velocity of the wind turbines are proportional to blade lengths. Blade length ratio of the large to the small wind turbines is normally about 10-15 times. Then wind turbine station may not be dangerous to birds and bats because of 10-15 times tip velocities.

Output of the wind turbine station, described herein, may have constant current, frequency and potential. Then the wind turbine station may displace conventional electricity generators have similar capacities.

DESCRIPTION OF SEVERAL VIEWS OF THE DRAWINGS

FIG. 1A is a detail of FIG. 1;

FIG. 13 is a front view of another form of the wind turbine station;

FIG. 14 is a top view of the station shown in FIG. 13;

DETAILED DESCRIPTION OF THE INVENTION

Figure 1:
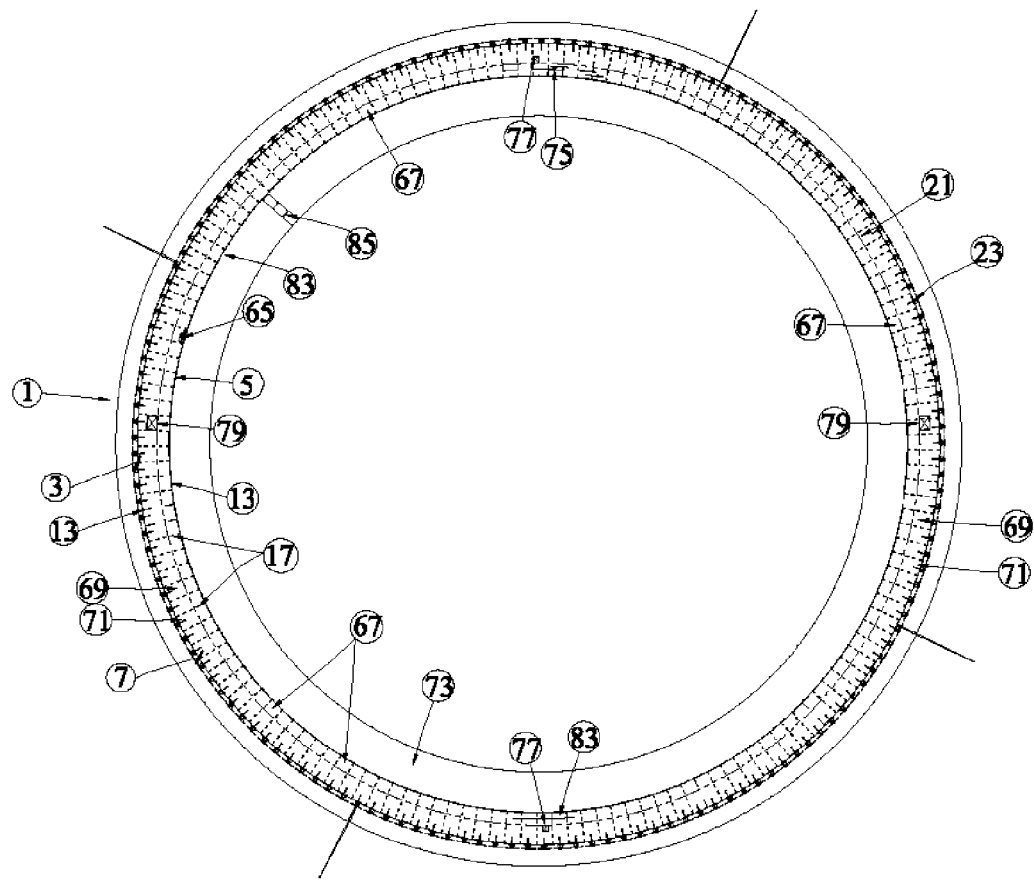
FIG. 1 is a top view of a typical large size wind turbine station, about 500 m dia.×2000 m height, with horizontal axis wind turbines.
Figure 1:
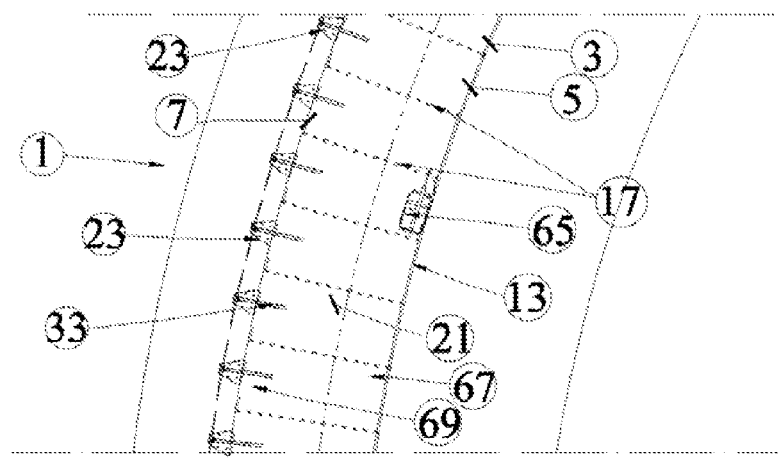
Figure 2:
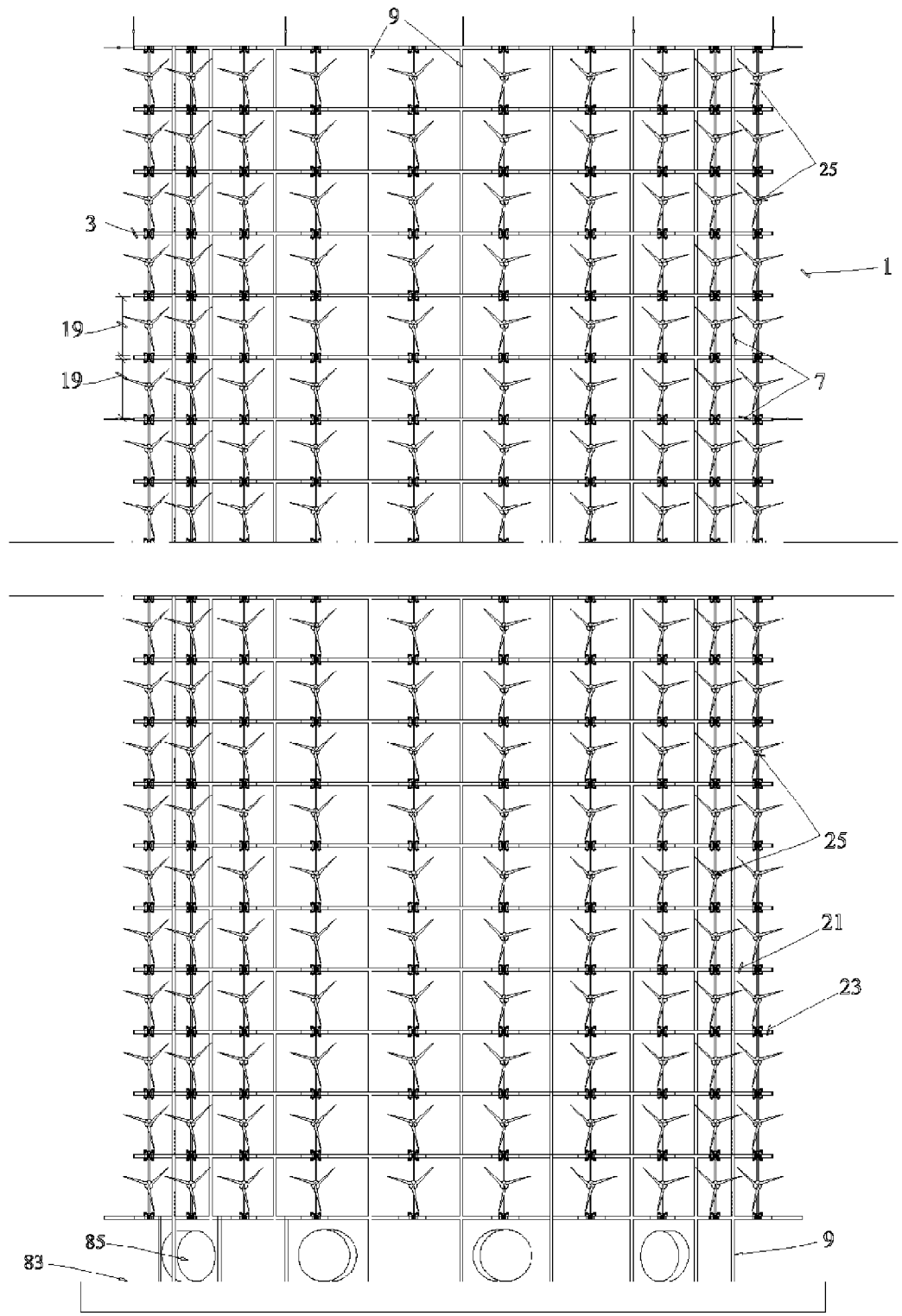
FIG. 2 is a front view of the station shown in FIG. 1.
Figure 3:
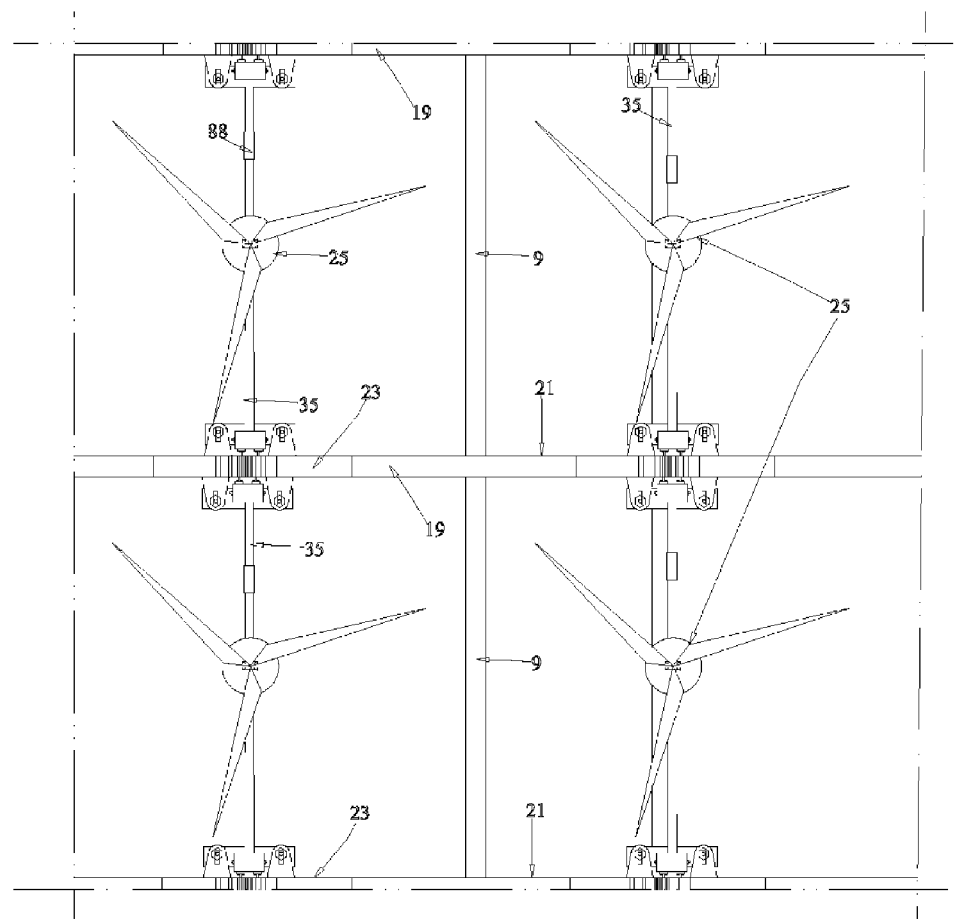
FIG. 3, is a partial, enlarged front view of the station shown in FIG. 1.
Figure 4:
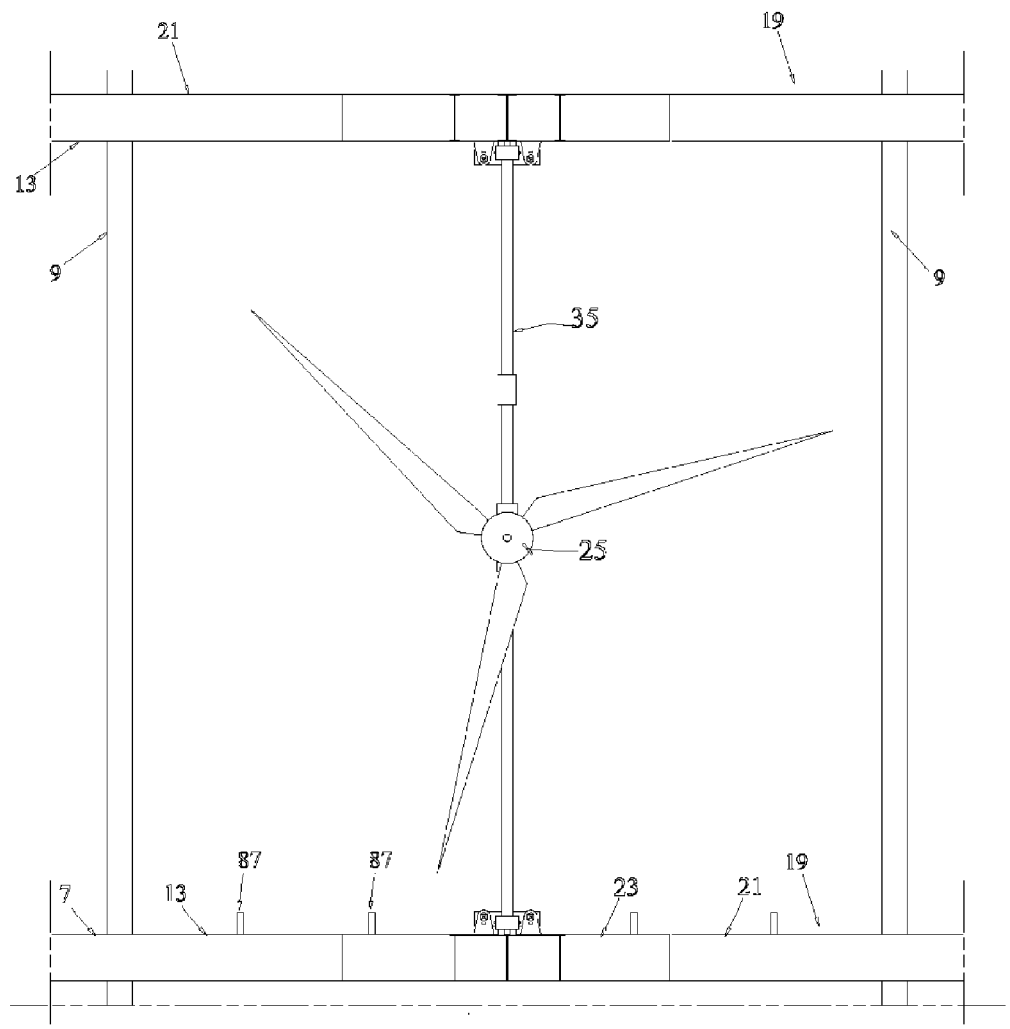
FIG. 4, is a partial, front enlarged front view showing a single horizontal axis wind turbine in the station.

The wind turbine tower 1, as shown in FIGS. 1-7, comprises an annular, open frame, structure 3 having at least an inner circular frame 5 and an outer circular frame 7. Each frame 5, 7 is composed mainly of vertical columns 9 and connected to horizontal main beams 13, Cross beams 17, extending between the frames 5, 7 and fastened to opposing main beams 13 in the frames and are the main elements connect the frames 5, 7 together. Cross elements in vertical planes, might be used to stiffen the connected frame by cross beams in vertical plans contain the cross beams, and may be used in the interior frame 5 to stiffen the interior frame and subsequently the whole frame structure. The open structure 3 has a plurality of levels or floors 19. Each floor 19 comprises a flat, ring-shaped, interior platform 21 extending between the inner and outer frames 5, 7 and supported on the cross beams 17 and the main beams 13. The height between adjacent floors 19 in the tower generally ranges between 7-12 m. The distance between adjacent columns 9, in the outer frame 7, is generally equal to the height between adjacent floors.

Sizes of main beams, columns and cross elements are determined by structural analysis of the whole frame structure. Structural analysis is based on, mainly, the weight of all columns, beams, and dead loads of turbines. Platform material is light with high strength. Average total distributed live load is estimated approximately 0.15 KPa. However, the design of interior platforms and beams must take into account the concentrated live loads from weight of vehicle mounted crane loaded anywhere on the interior platforms. Seismic forces add a small fraction to stresses which resulted mainly from gravity loads. The small effect is because of comparatively light self weight of the structure, dead loads and live loads in a unit area, in comparison with a similar material building of conventional construction. The smaller loads are because the number of floors in the wind turbine station is about 3 times less than conventional construction and because there is no finishing and there are no partitions except the partial inner walls in the frame 5. Aspect ratio of the frame structure which means height to diameter ratio, is low and generally is about 4 which provide sufficiently large stiffness of the whole frame structure to sustain seismic loads without considerable increase in frame section areas. Frame columns are made usually from high yield steel. Steel columns are designed using structural analysis of the whole frame structure due to self weight, dead loads and live loads, and verified for wind and seismic loads. Most of wind energy, approximately 90% are absorbed by turbines, even during design wind speeds which might be several hundreds KM/h in some countries. That because the wide range of operational wind speeds of small HAWT and VAWT. Most of the times, design wind speed is less than cut-out speed of the wind turbines and effects of wind might be negligible.

The structure 3 includes a plurality of small exterior platforms 23 extending outwardly from each interior platform 21 past the outer frame 7 and about the outer frame 7. An exterior platform 23 is preferably to be centrally located between each pair of adjacent columns 9 about the outer periphery of each interior platform 21. The exterior platforms 23 are preferably vertically aligned over the height of the tower 1. A wind turbine 25 is mounted on each exterior platform 23. The wind turbine 25 shown is a known horizontal axis wind turbine but it can also be a known vertical axis wind turbine. The turbine 25 has a width slightly less than the width between two adjacent columns 9 in the outer frame 7 and has a height slightly less than the height between adjacent floors 19.

Figure 5:
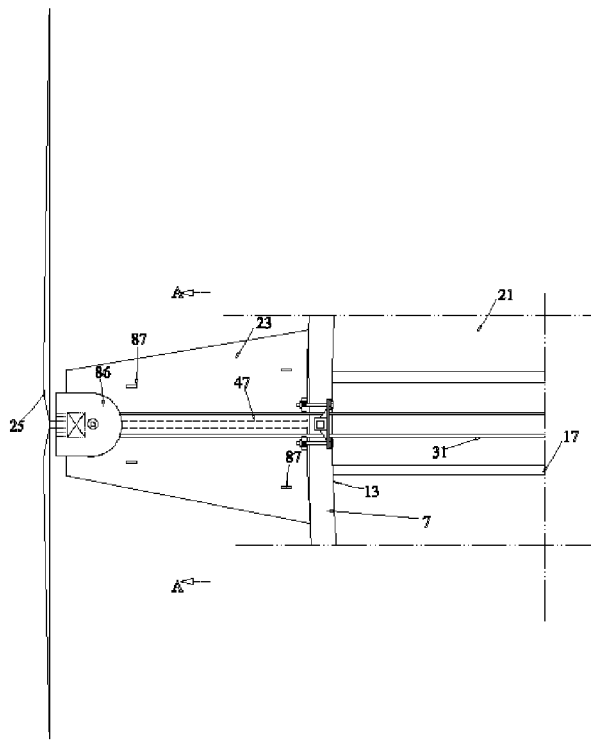
FIG. 5, is a partial top view of the turbine shown in FIG. 4.
Figure 6:
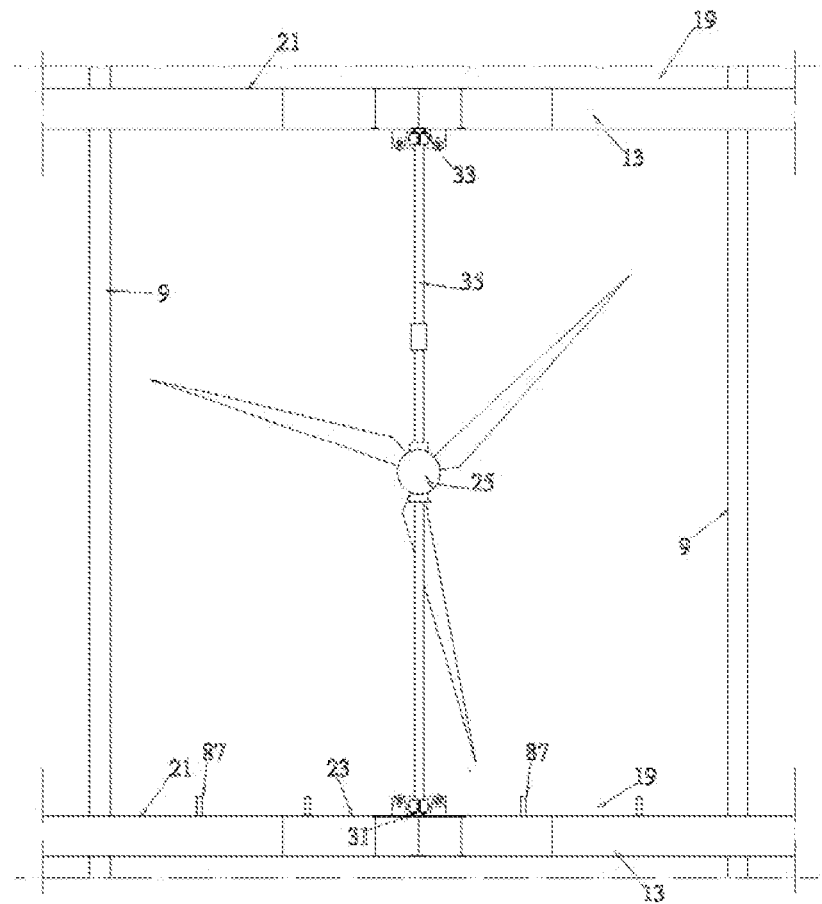
FIG. 6 is a enlarged back view showing a single horizontal axis wind turbine in the station.
Figure 7:
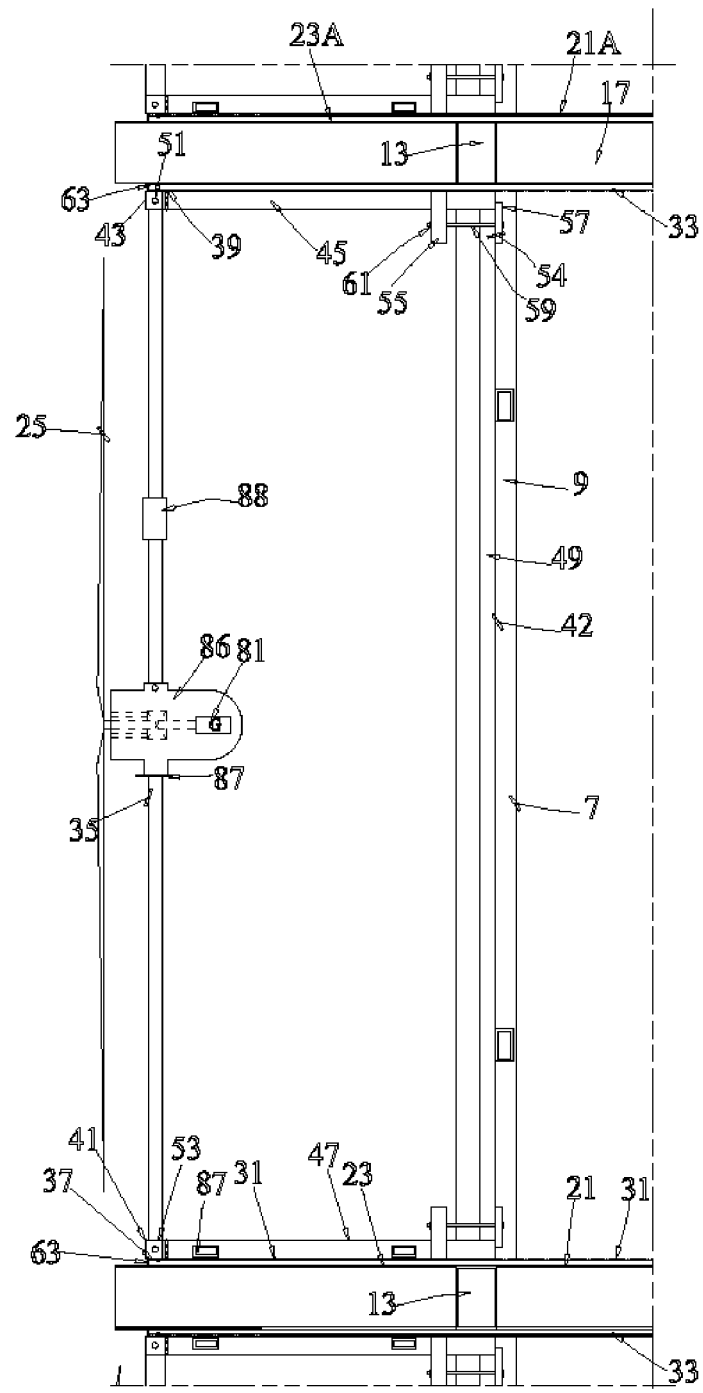
FIG. 7 is a side view of a single turbine in the station.
Figure 8:
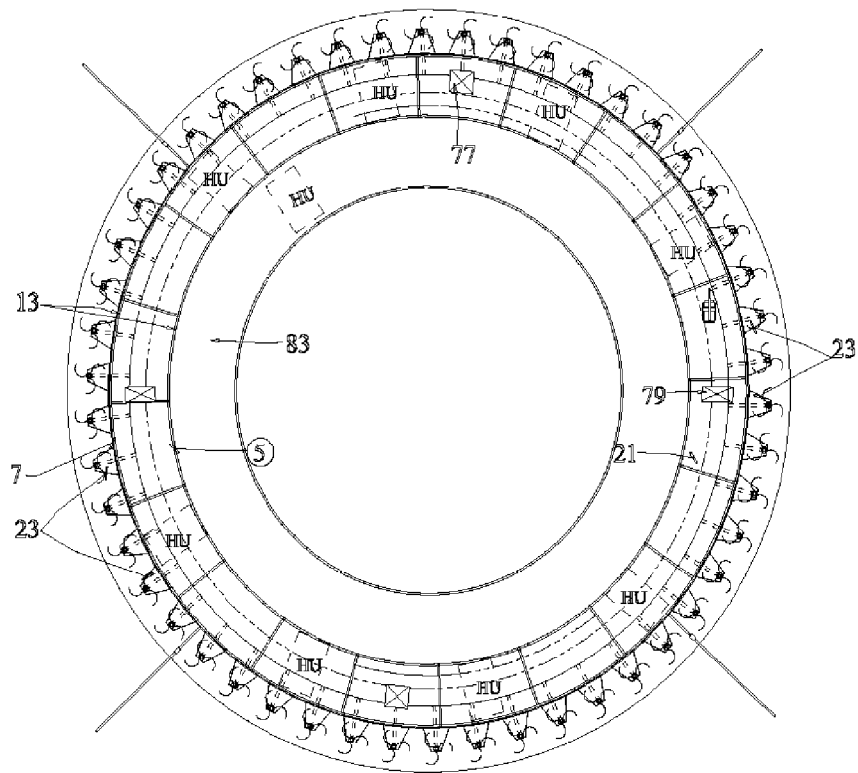
FIG. 8 is a top view of a typical small size wind turbine station, about 125 m dia.×500 m high, with vertical axis wind turbines.
Figure 9:
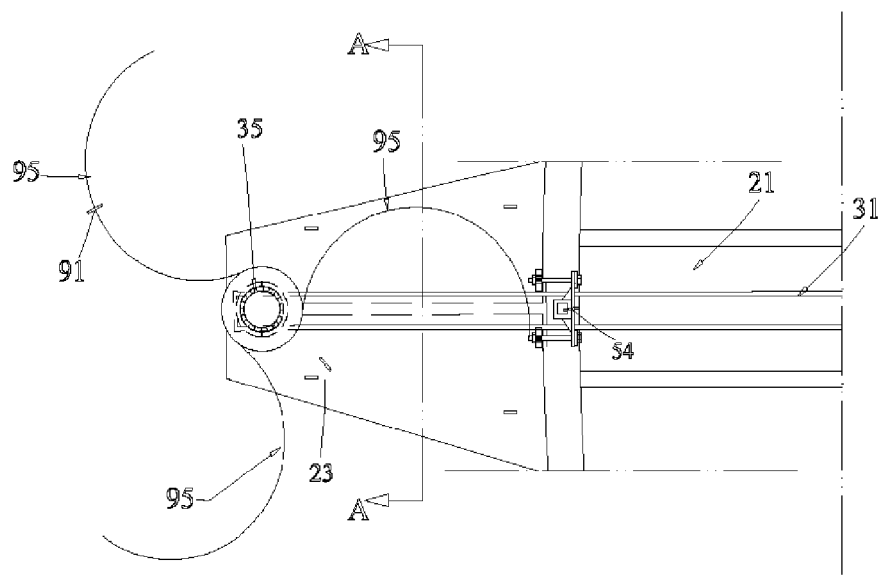
FIG. 9 is a partial top view of a VAWT turbine from the station in FIG. 8 showing it mounted on an exterior platform.
Figure 10:
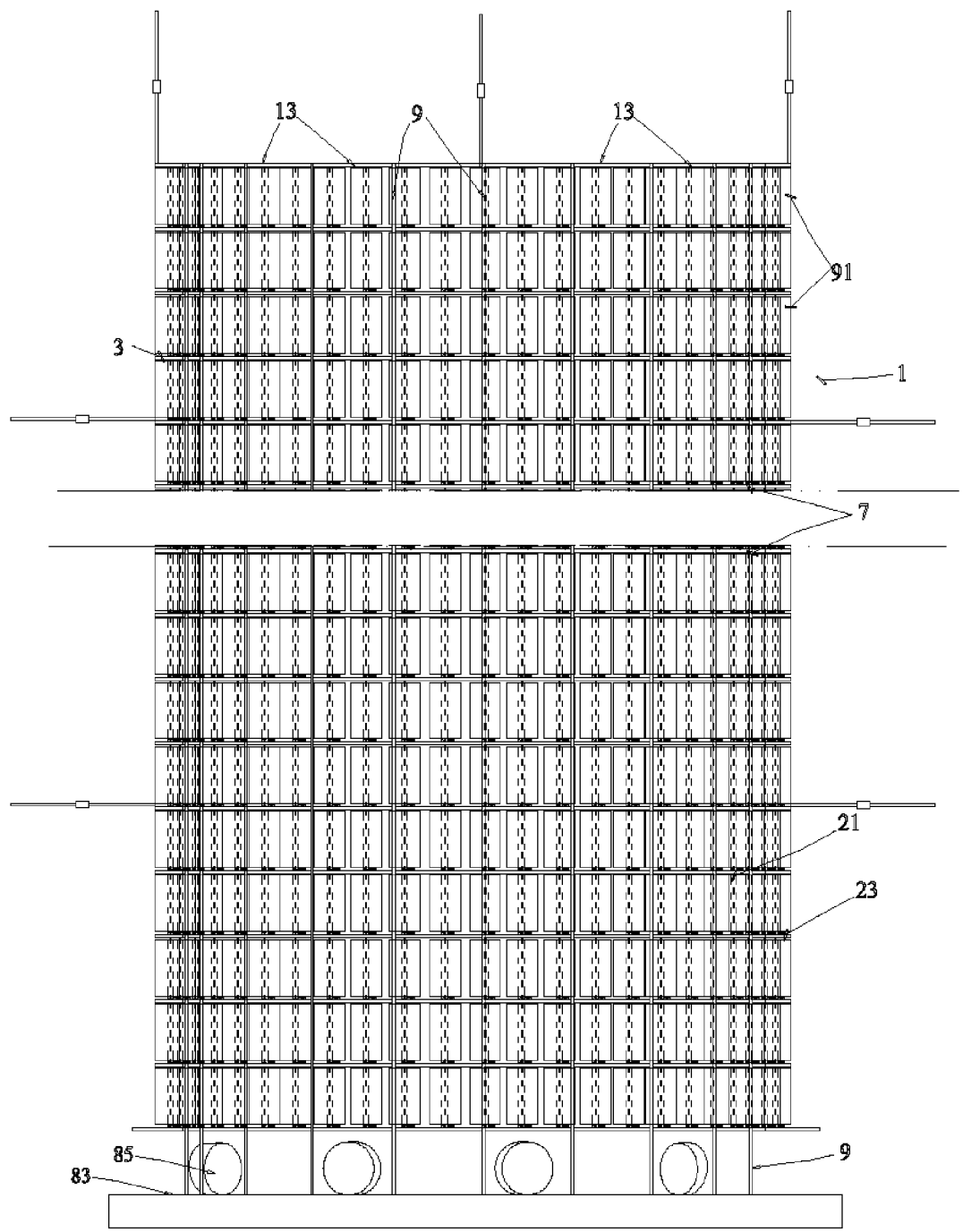
FIG. 10 is a partial front view of the station shown in FIG. 8.
Figure 11:
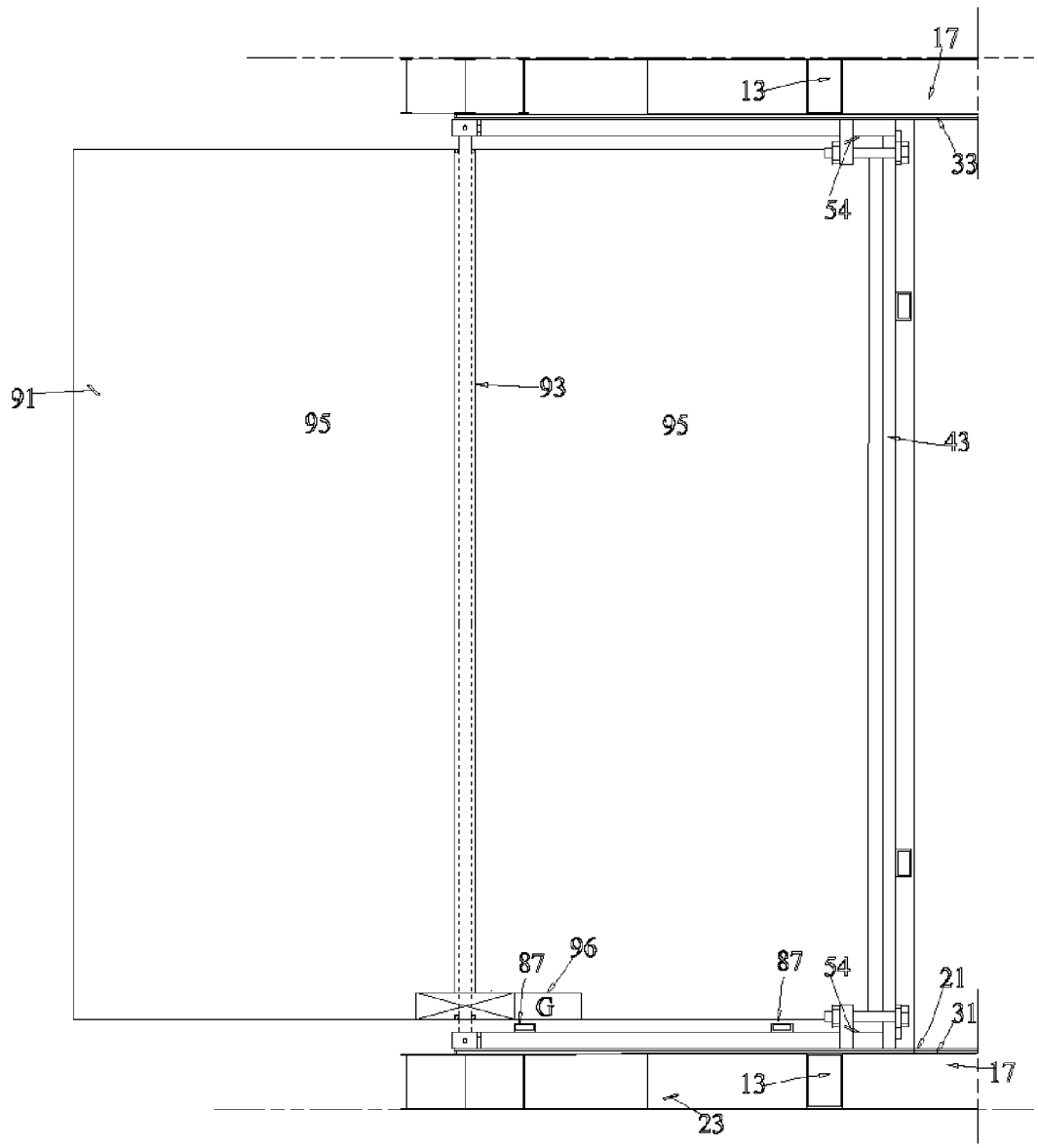
FIG. 11 is a side view of a single turbine in the station shown in FIG. 8.

Each turbine 25 is mounted on track means for movement between an operating position on the outer end of its exterior platform, 23 and an inoperative, servicing position on the interior platform 21 near the outer frame 7. The track means, as shown in FIGS. 5, 6 and 7, can comprise a lower track 31 extending radially outwardly from the interior platform 21 to near the outer end of the exterior platform 23. The track means includes an upper track 33 overlying the bottom track 31. Both tracks can be made from a wide flange steel I beam or steel T beam. The tracks are welded to secondary or/and main beams in both the interior and exterior platforms. The upper track 33 for example could be attached to the bottom of a cross beam 17 which supports the adjacent upper interior platform 21A and adjacent upper exterior platform 23A as shown in FIG. 7.

The turbine 25, shown as a horizontal axis turbine, is mounted on a vertical stationary axel 35 which has track guides 37, 39 at its lower and upper ends 41, 43 cooperating with the lower and upper tracks 31, 33 respectively to guide the movement of the turbine between the operative and inoperative positions. The track guides 37, 39 can comprise short channel sections welded horizontally on the top and bottom of the axel 35, the guides 37, 39 fitting snugly and able to move smoothly over the tracks 31, 33. A maintenance frame 42 is connected to the ends of the stationary axel 35 of the turbine for use in moving the turbine between operative and inoperative positions. The frame 49 has parallel upper and lower horizontal arms 45, 47 rigidly connected at one end to a vertical post 49. The other ends of the arms 45, 47 are connected to the top and bottom of the axel 35 by short tubes 51, 53. The other ends of the arms 45, 47 can be pivotally connected to the tubes 51, 53 if desired. The other ends of the arms 45, 47 can also be rigidly fastened to the track guides 37, 39 if it is desired to connect the track guides indirectly to the axel 35. The maintenance frame 42 can be used to manually or mechanically pull the turbine 25 back from the exterior platform 23 onto the interior platform 21 for servicing, sliding it along the upper and lower tracks 31, 33, and then returning it along the tracks to its operative position on the exterior platform 23 after servicing. The vertical post 49 can have handles to be able to manually pull the maintenance frame 42 and thus the turbine 25 on the tracks 31, 33.

Locking means are provided for locking the turbine 25 in an operative position. The locking means, as shown in FIG. 7, can comprise top and bottom locks 54 connecting the rear of the maintenance frame 42 to the top and bottom cross beams 17 or main beams 13. The top and bottom locks are the same so only one will be described in detail. The top lock 54 comprises first aligned plates 55 fixed to the sides of cross beam 17 and a second plate 57 fixed to the ends of post 49 and aligned with plates 55. Plates 55 each have a threaded bolt hole (not shown). Second plate 57 has a slot (not shown) aligned with the bolt hole in each first plate 55. Bolts 59 are passed through the aligned slots in plate 57 and threaded though the holes in first plates 55. A nut 61 can be placed on each bolt to retain it in position. The bolts 59 are tightened to move the maintenance frame 42 and thus the turbine 25 tight against stop plates 63 on the cross beams 17 at the end of the tracks 31 and 33 to securely lock the turbine in the operative position. The bolts are removed to allow the turbine to be moved back off the exterior platform for servicing.

Each interior platform 21 is wide enough, 8-25 m, to allow a vehicle mounted crane 65 to be driven about the platform to replace or service individual turbines. The platform 21 preferably has at least one traffic lane 67, as shown in FIG. 1A, adjacent the inner frame 5 in the close cross section frame structure and adjacent the middle of the interior platform 21 in the open cross-section or serpentine frame structure in the wind turbine station, for use by the vehicle 65 with servicing space 69 adjacent the traffic lane 67 for receiving the turbine when it is moved back from the exterior platform for servicing, and with track space 71 for the guide tracks 31, 33 for the turbines to move on the outer portion of the interior platform adjacent the outer frame 7. Each interior platform 21 has a first ramp 73 adjacent its inner side leading up to the platform above and a second ramp 75 adjacent its inner side and spaced from the first ramp 73, leading down to the platform below. This will allow the vehicle carrying a crane to service turbines on a number of floors in the tower.

Passenger elevators 77 and freight elevators 79 can be provided in the tower passing through the interior platforms 21 or adjacent the inner edge of the platforms. The freight elevators 79 are about 5×10 m. with about 10 metric ton capacity sufficient to carry a truck mounted crane or a complete wind turbine for installation, or steel beams and columns. The elevators are built simultaneously with the frame structure construction, so they can be used during the construction stage to supply construction materials to the platforms. The passenger elevators 77 have capacity to lift about 20 people at a time to their corresponding platforms where they work to monitor operation and maintain the wind turbines.

Each turbine 25, in the operative position, rotated by the wind, generates electricity through a generator 81 on the turbine, where the electricity fluctuates with wind speeds and varies considerably over time. The electricity generated is conducted via a conductor (not shown) common to all the turbines vertically aligned in one column to the base 83 of the tower. Preferably, the electricity is conducted to a hydrogen unit 85 which includes known inverters, transformers; electrolizers filled with electrolyte, pure water tanks, hydrogen purifiers, hydrogen storage tanks, fuel cell generators and pressurized pumps as is known. The hydrogen unit 85 provides a consistent electrical supply with stable electricity characteristics of frequency, current and potential. Alternatively, if the electricity is generated with aimed fixed frequency as known, the electricity can be directly connected to an electrical grid. Moving core of the generator 81, with or without a gear box, transfers motion from the rotating axel of the turbine 25 to the electricity generator 81. There is no necessity to have a high speed axel to increase the frequency of generated electricity if the generated electricity will be used for hydrolysis. That reduces wear and tear, maintenance costs of the generators and fabrication costs.

Each turbine also has a nacelle 86 covering the generator 81. The nacelle 86 is mounted on the middle of a stationary axel 35, on top of a steel base plate 87 welded to middle of the stationary axel 35. The top of the nacelle is connected to the top part of the stationary axel with a pipe connection 88 which is threaded from inside and can be loosened to free the bottom of the top part of stationary axel. The nacelle 86 is fixed in place on the steel base plate 87, the bottom part of the top stationary axel can be inserted in the hole located at the top of the nacelle, as the bottom art of the stationary axel above the nacelle, is little shorter than the distance between bottom point of the stationary axel top part and the bottom of the nacelle hole. The minimum length of the pipe connection 88 is generally 5"-8" (125 mm-200 mm) As known, the yaw system of a nacelle directs the blades towards wind and can be active or passive depending on the chosen individual turbines.

Figure 12:
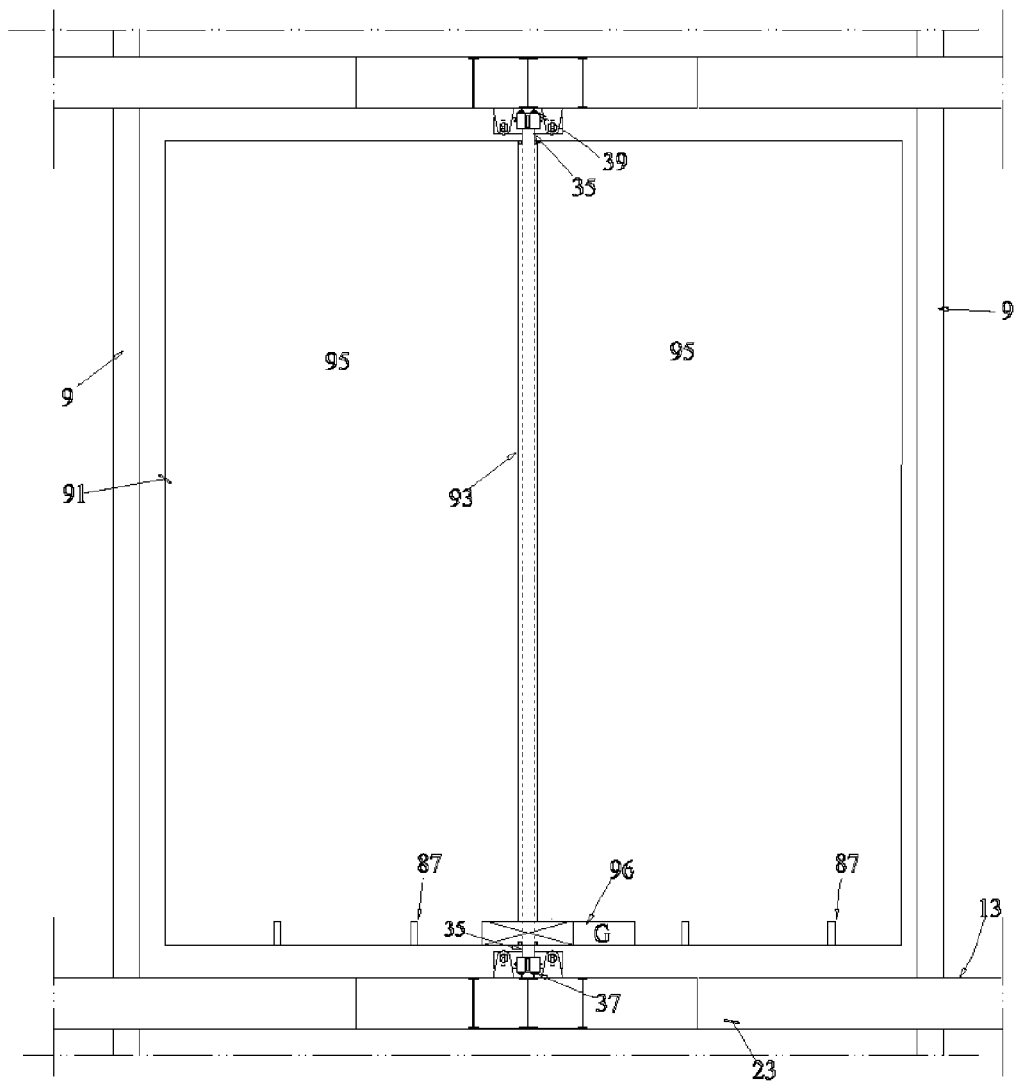
FIG. 12 is a front view of a single turbine in the station shown in FIG. 8.

FIGS. 8-12 show the tower with vertical axis wind turbines 91. Each turbine 91 has a rotatable, vertical post 93 rotatably mounted about a stationary axle 35. Top and bottom bearings rotatably mount the post 93 on the axle 35. The post 93 carries curved vanes 95. The stationary axle 35 is connected to the lower and upper tracks 31, 33 on the exterior platform 23 and the interior platform 21 as above using track guides 37, 39 fixed to the ends of the axle 35 and mounted over the tracks. A maintenance frame 42 is connected to the ends of the stationary axle 35 and locking means 54 are provided for locking the frame 42 and thus the turbine 91 tight against stop means on the ends of the tracks 31, 33. The locking means can be unlocked and the turbine moved for servicing along the tracks 31, 33 from the exterior platform to the interior platform. The turbine 91 is generally sized to fit between adjacent columns 9 in the exterior frame 7 and between adjacent beams 13 in the frame 7 as shown in FIG. 12. Rotation of the turbine by the wind while on the exterior platform will generate electricity in a generator 96 at the bottom of the post 93 and known means will transmit the electricity electrical cables run from top to bottom of the structure 83 to electrolizers at the base of the tower.

Figure 15:
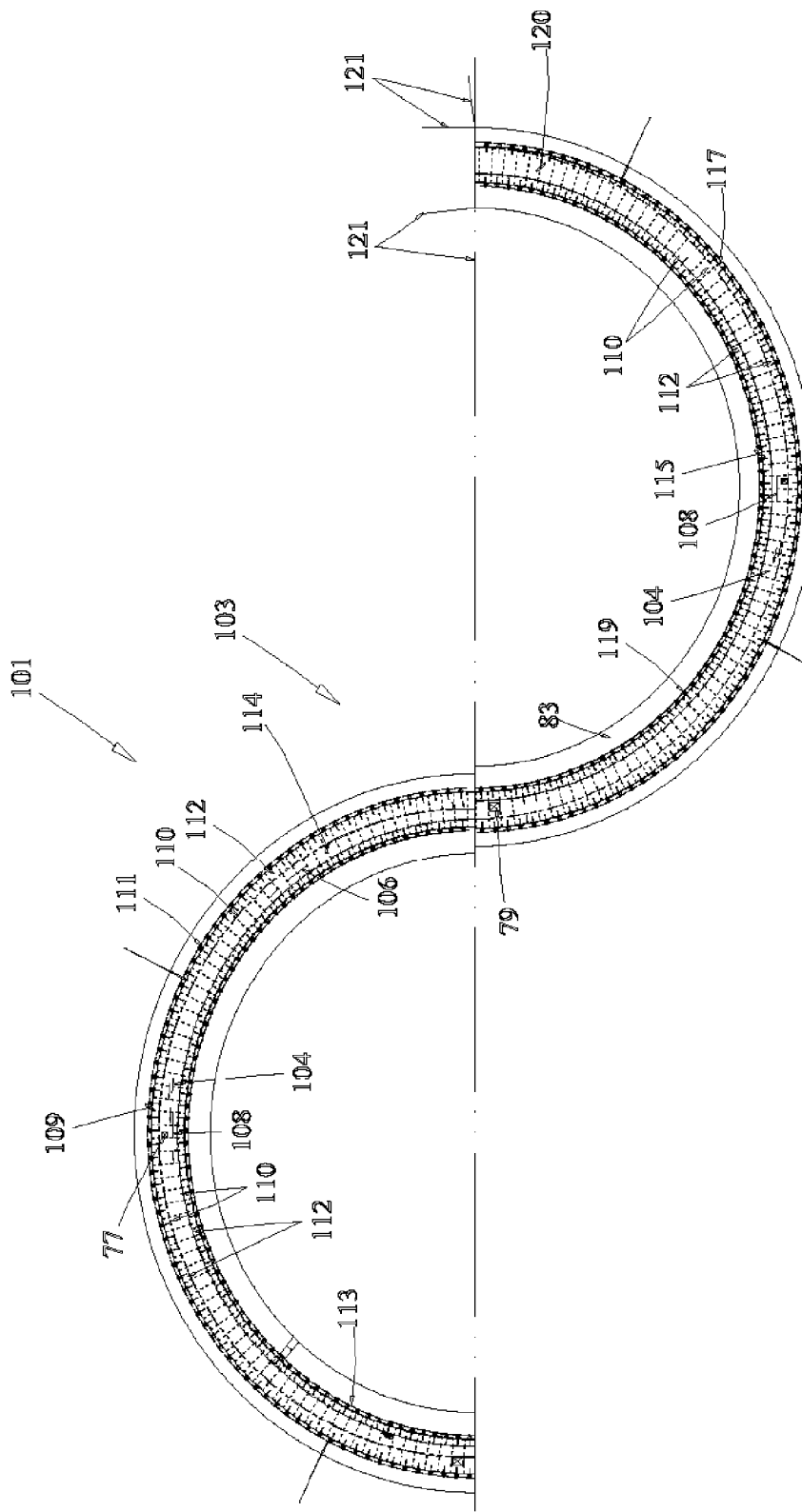
FIG. 15 is a detail top view of part of the station shown in FIG. 14.

FIGS. 13-15. show the tower 101 being of a serpentine shape. The open frame structure 103 has at least two alternating half loops of the frames 5, 7. The first half loop 109 has a first convex outer frame section 111 forming half a circle or polygon and a first concave inner frame section 113 spaced from the first outer frame section 111 also forming a half a circle or polygon. The frame sections 111 and 113 are connected by mainly main 13 and cross beams 17 (not shown). A series of vertically spaced apart interior platforms 114 in the shape of a wide, flat half ring connected to the main and cross beams and form the floors in the structure. Turbines are mounted on exterior platforms extending outwardly, preferably from both the first convex outer frame section 111, and interior section 113. Exterior platforms extend outwardly from each interior platform 114 and track means extend over each exterior platform and part of the associated interior platform so a turbine can be moved between an operating position on the exterior platform and a servicing position on the interior platform. The second half loop 115 is connected at one end to the end of the first half loop 109 and has a second convex outer frame section 117 forming a half circle or polygon, facing in the opposite direction of the first convex outer frame section 111 of the first half loop 109. The second half loop 115 includes a second concave inner frame section 119 spaced from the second convex outer frame section 117 and also forms a half circle or polygon. The frame sections 117 and 119 are connected by mainly main 13 and cross beams 17, (not shown). Another set of vertically spaced apart interior platform 120 in the shape of a wide, flat, half ring connected to the main and cross beams along the half loop 115. The interior platforms 120 are aligned with the interior platforms 114 and connected to them. Turbines are mounted, preferably, on both exterior platforms facing outwardly from the second convex outer frame section 117 and from concave interior fame section 119. The second convex outer frame section 117 is connected to the end of the first concave inner frame section 113 and the second concave inner frame section 119 is connected to the end of the first convex outer frame section 111. The pattern is repeated for the length of the structure. Both ends of the structure can be anchored with cables 121. The cables 121 are usually steel cables or carbon fiber cables and can be fixed to ground from one end of a corner column at a level higher than middle of the height of an open frame structure unit. The cables 121 usually fix 2 end corners of the serpentine tower, each corner fixed with 2 cables which make normally 90 degrees between each other. The unit can have a height from 200-1000 m, diameter 50-500 m and length varies 1-10 half loops. Each interior platform 21 is wide enough, 8-25 m, to allow a vehicle mounted crane 65 to be driven about the platform to replace or service individual turbines. The interior platforms 114 and 120 each has preferably at least one traffic lane 104, as shown in FIG. 15, in the middle of the platform to use by the vehicle 65 with servicing space 110 adjacent the traffic lane 104 for receiving the turbine when it is moved back from the exterior platform for servicing, and with track space 112 for the tracks 31, 33 on the outer portion of the interior platform adjacent the outer frame 7 or inner frame 5. Each interior platform 114 and 120 has preferably both first ramp 106 leading up to the platform above and a second ramp 108 spaced from the first ramp 106 and leading down to the platform below.

The simple way to build a tower is to use several truck mounted cranes 65 on the ground floor to build the first floor including, columns, beams and interior platform 21 and install freight elevators 79 and passenger elevators 77 simultaneously from the ground floor to the first floor. Then finish building the first floor internal platform 21 and external platforms 23 by moving the cranes 65 to the first floor platform 21 by the ramps 73 that connects ground floor to the first floor 21 and using the elevators which built up to $1^{st}$ floor to move the construction materials, from the ground floor to the $1^{st}$ floor. Then building the columns, beams and internal platform of the second floor and extending the elevators to the second floor. The cranes 65 can move up to the second floor via ramps connecting the first floor to the second floor to complete the second floor and to build the third floor. Then those steps are repeated until the end of the tower. Construction materials are lifted to the floors as the internal platforms are completed, by freight elevators 79. The exterior platforms 23 are pre-made or are built on site, then installed using four lifting rings 87, cranes 65 to weld it to the main beams 13 or cross beams 17 by using at least 4 steel plates connect between the top and bottom the beams 13 and cross beams 17 if needed and top and bottom of the exterior platform. 2 or more plates at the top and two or more at the bottom of the platform common edges with the outer frame beams 13. Wind turbine 25 or 91 installation can be started after construction cranes move two or three floors ahead and by using several other truck mounted cranes 65 and the freight elevators 79. Installation of the hydrogen units 85 can be started after finishing construction of ground floor and first floor. Electrical work might be started when part of the electrolyzers 85, and hydrogen storage tanks which have total capacity proportional to the capacity of installed wind turbines 25 or 91 which are ready to operate. Electricity might start to be generated from this stage, including generating hydrogen, storing it under pressure and starting fuel cell generators to run and supply electricity to grid or/and for construction processes. The inventors, prove theoretically that if know small HAWT and VAWT have similar efficiency, with utility HAWT in a 6 m/sec (13.4 mph) average wind speed environment, and for 4 m/sec (8.95 mph) cut in speed for all turbines, and 12 m/sec (26.84 mph) rating wind speed of utility HAWT, the small HAWT and VAWT will be give 11% more output that the utility wind turbines.

Figure 16:
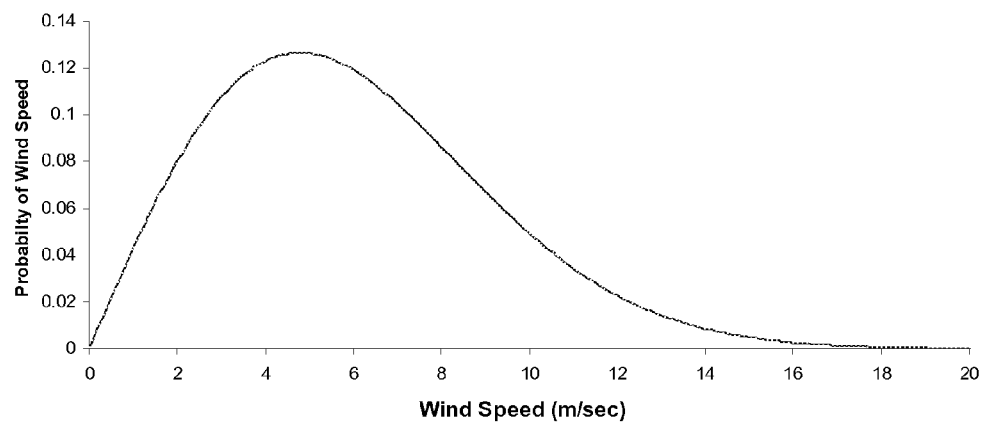
FIG. 16 is a graph showing the Rayleigh Distribution of Wind Speed, where assumed average wind speed=6 m/sec.
Figure 17:
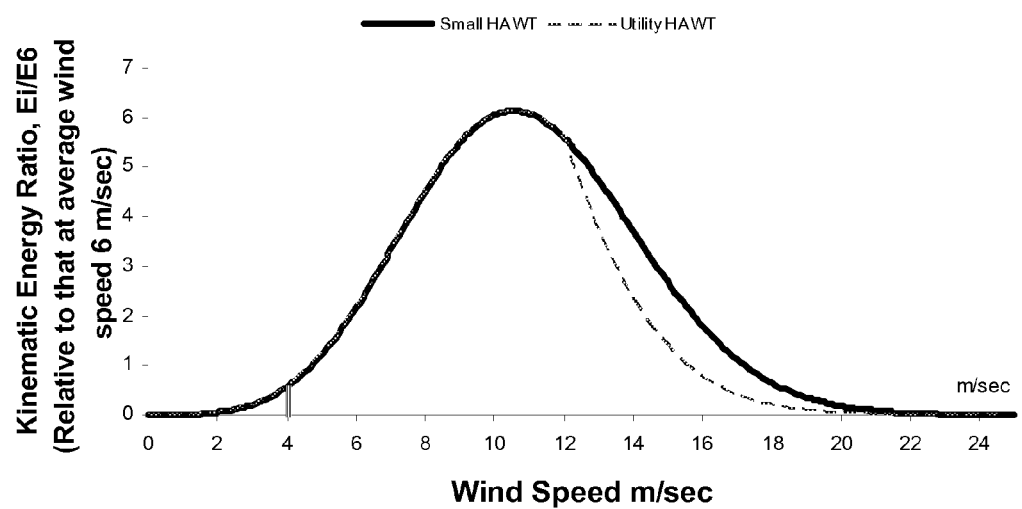
FIG. 17 is a graph shows the harvested energy by small HAWT (or VAWT) and Utility HAWT during long term, assuming random Rayleigh distribution of wind speeds.
Figure 18:
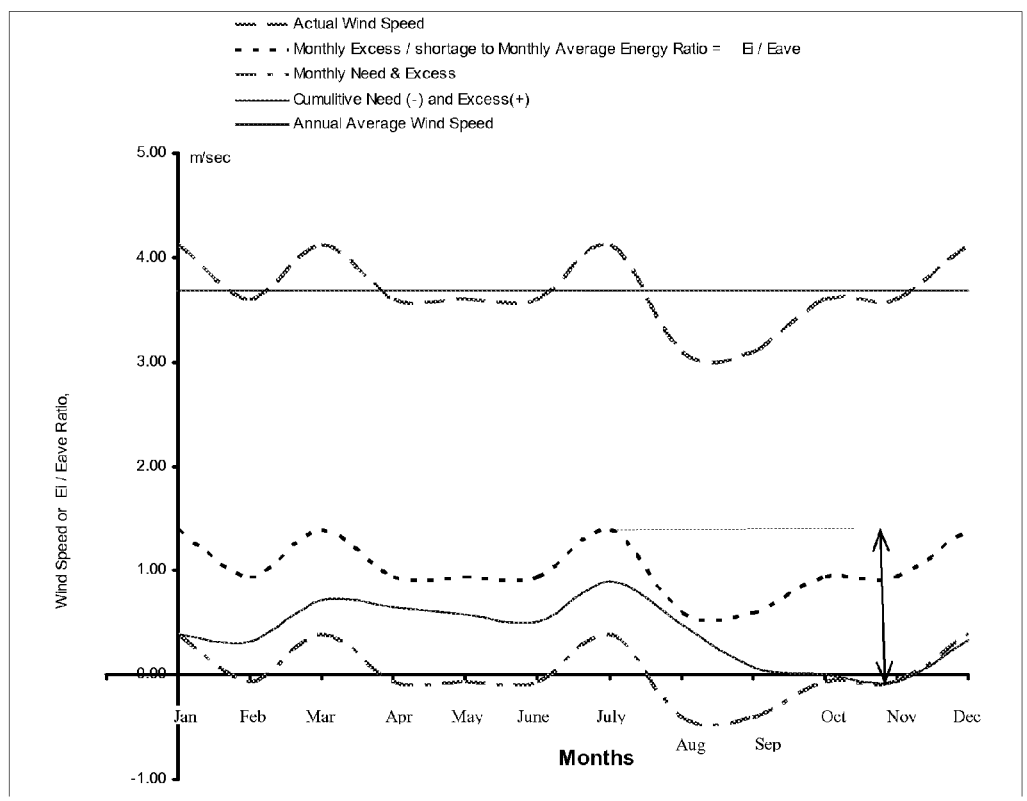
FIG. 18 is a graph showing the required energy to be stored in hydrogen relative to average monthly consumption, $E_{ave}$

The higher the average wind speed, the greater the output ratio $$\frac{E_{SmallH}}{E_{LargeH}}$$

which increases to about 3.0 for 12 m/sec and to 50.0 for 30 m/sec average wind speeds which available at certain heights. The proof example is illustrated in FIGS. 16 and 17 graphs. This is proved by integrating areas under energy graphs in FIG. 17. FIG. 17 shows that total harvested energy in long term such as a year is:

$$\text{Utility HAWT} \Rightarrow E_{LargeH} = \frac{E_{tot}}{E_6} = 1.69 \Rightarrow$$

Average real expected harvested energy in one year period=$1.69 \times E_6 \times 0.30 = 0.507$ $E_6$ $$\text{Small HAWT} \Rightarrow E_{SmallH} = \frac{E_{tot}}{E_6} = 1.88 \Rightarrow$$

Average real expected harvested energy in one year period=$1.88 \times E_6 \times 0.30 = 0.564$ $E_6$ $$\frac{E_{SmallH}}{E_{LargeH}} = \frac{0.564}{0.507} = 1.11$$

Where: E6 is average harvested energy assuming wind speed is constant and equal to annual average wind speed 6 m/sec.

The reason for the higher output is that HAWT has smaller tip speeds proportional to the ratio of rotor diameters. Giant or utility HAWT reach their cut-off speed for 10-12 m/sec, and cut-out speed at 25-40 m/sec which means part if wind energy is not cultivated by large wind turbine while small HAWT cut-off speed is generally higher than 175 m/sec which means maximizing wind energy cultivation. Fluctuation in wind energy generated electricity supplied to electrolyzers affects short term generated quantities of hydrogen which pumped to hydrogen tank storages which are either pressurized, liquefied, or temporarily combined with other known solid or liquid materials. However, total quantity of generated hydrogen, in a long term such as a year, is affected mainly by annual average wind speed in the wind turbine site, and related to consumption demand average and fluctuation and capacity of the wind turbine station. Capacity of hydrogen storage is estimated by calculating a relative energy ratio of monthly need or excess to average generated energy, $E_i/E_{ave}$, where $E_i$ (KWH) is monthly consumed energy which exceeds demand or energy needed to be supplied from stored hydrogen to meet average demand. This ratio depends on actual existing or predicted consumption charts, where $E_{ave}$(KWH) is monthly average demand that equals monthly average generated electricity by fuel cells. Then calculate relative cumulative energy ratio. Then total energy required to be stored in hydrogen is the difference between largest positive excess and largest absolute negative number in the cumulative chart. FIG. 20 shows that 0.90 $E_{ave}$+0.06 $E_{ave}$=0.96 $E_{ave}$. The hydrogen tanks should have capacity to store hydrogen needed to generate 0.96 $E_{ave}$ in order to have supply consistent with demand all year around in the chosen site in the example. Then hydrogen storage weight can be calculated by dividing 0.96 $E_{ave}$ by normally known 36 kwh that is medium Hydrogen Heating Value. Then required stored Hydrogen weight $(Kg H^2)=0.96 \times E_{ave}/[36(KWH/Kg) \times 0.41]=0.0678 \times 0.96$ $E_{ave}=0.65$ $E_{ave}$ (KWH). Where, 0.41 is efficiency factor of fuel cells. The Hydrogen weight can be converted to a volume capacity according to the pressure used in storage or liquefaction technique. In addition, monthly average consumption of energy equals to monthly regular generated electricity by the wind station which is: $E_{ave}=E_{avew} \times 0.61 \times 0.41$ where $E_{avew}$ is average monthly generated fluctuating electricity, 0.61 is efficiency of electrolysis process, 0.41 is efficiency of fuel cells.

The wind turbine station can also mass produce hydrogen for industrial purposes, and for transportation. In addition, using wind station reduces heavy burdens of managing wind electricity output balance that is normally very difficult and costly with current state of the art wind turbines.

The wind turbine station provides the following improvements over the current wind energy.

a) Increases operational height up to 2000 m, wherein wind speed increases considerably.
b) Higher capacity up to 1000 MW of regular, not fluctuating electricity generated in a 6 m/sec average wind speed at 10 m height environment.
c) Allows large capacity wind turbine station to be built very close to urban areas. This is the reason why it's first named Economical Urban Wind Turbine Station for Continuous Electricity Generation.
d) Supply wind electricity consistent with demand and has constant current, frequency and potential.
e) Smaller volumetric size in comparison with totally built same shape and size building which highly increases stiffness and reduces costs.
f) Wind turbine station allows continuous maintenance or more operational hours and higher efficiency.
g) Reduces noise from HAWT wherein small wind turbines have lower tip speeds at greater heights.
h) Decreases hundred times horizontal land space required for 1 MW which further reduces electricity costs and adverse social impact on wind energy and makes wind energy more competitive.
i) Reduces costs of generating wind energy several times than utility wind turbines.
j) Produce hydrogen on large scale for industry uses and with cheaper costs.
k) There is no need to have normal constant frequency of wind generator output when electricity is supplied to hydrogen units to generate hydrogen. Then there is no need for gears which further reduce electricity costs and elongate the generator life cycle.
l) Reduces environmental impact on birds because small HAWT and VAWT turbines which have small tip speeds are by far less dangerous to birds.

To avoid incidental crashes with air crafts, known flashing warning lights are installed around the exterior tower frame 7 and along height.

A known lightning protection system is installed to save staff in the wind turbine station.

We claim:

1. A wind energy shell turbine station comprising; a multi floor structure having open framing; the open framing comprising, at least two spaced-apart open, substantially parallel vertical frames, the frames each having one or more spans in one or more horizontal directions, and each made of frame beams and columns, the frames interconnected to each other by interconnecting beams and form one spatial structure; a plurality of vertically spaced horizontal flat interior platforms forming the floors of the structure, each interior platform extending between and supported by the frame beams and by the interconnecting beams over the length of the frames; wind turbines mounted on the structure about the outer periphery of each interior platform, the turbines facing outwardly, and wherein each wind turbine is operatively connected to a generator to produce electricity.

2. A station as claimed in claim 1; wherein the structure has spaced-apart exterior platforms extending outwardly from said outer periphery of each interior platform past the frames; the plurality of wind turbines being mounted on the exterior platforms, one wind turbine per exterior platform.

3. A station as claimed in claim 2; wherein each exterior platform includes track means extending inwardly past said periphery of the interior platform and onto the interior platform, said wind turbines, each movably mounted on the track means so that the wind turbines can be moved between a working position on the exterior platform and a servicing position on the interior platform between the spaced apart vertical frames.

4. A station as claimed in claim 1; wherein each interior platform is wide enough in order to allow space for moving each wind turbine from an operating position, inwardly relative to one of the vertical frames to a servicing position on the interior platform in order to allow space on the platform at the servicing position for said wind turbine to be serviced; and to allow space on the platform between the servicing position and another one of the vertical frames for a roadway for a vehicle mounted crane to travel between service positions and to have access to each turbine on the platform at its operating position.

5. A station as claimed in claim 1; wherein each interior platform has a first vehicle ramp on a roadway leading to an adjacent upper interior platform and a second vehicle ramp on a roadway leading to an adjacent lower interior platform.

6. A station as claimed in claim 1 wherein the wind turbines can be horizontal axis wind turbines; vertical axis wind turbines; or a combination of horizontal axis and vertical axis wind turbines, the wind turbines, each having a height slightly less than the distance between vertically spaced interior platforms.

7. A station as defined in claim 1, wherein hydrogen based electricity generation units are located on the multi floor structure, each unit comprising electrolyzers which are fed by electricity generated by said wind turbines, the electricity being converted to DC and transformed to proper low voltage and adequate amperage for the electrolyzers, and the electrolyzers producing hydrogen which is stored in hydrogen tanks, and the hydrogen tanks are in communication with hydrogen operated fuel cell generators which generate non-fluctuating electricity.

8. A station as claimed in 1; wherein the vertical frames are serpentine when viewed from above, with alternating half circular or polygon loops, the turbines mounted on the interior platforms adjacent to the peripheries of each loop.

9. A station as claimed in claim 8; wherein the structure has spaced-apart exterior platforms extending outwardly from said outer periphery of each interior platform past the frames; the plurality of wind turbines being mounted on the exterior platforms, one wind turbine per exterior platform.

10. A station as claimed in claim 9; wherein each exterior platform includes track means extending inwardly past said periphery of the interior platform and onto the interior platform, said wind turbines, each movably mounted on the track means so that the wind turbines can be moved between a working position on the exterior platform and a servicing position on the interior platform between the spaced apart vertical frames.

11. A station as claimed in claim 10; wherein said exterior platforms are vertically aligned with each other; said track means comprising a lower track on the exterior platform and the interior platform; and an upper track vertically aligned with the lower track, wherein the upper track is on the bottom of both an adjacent, upper exterior platform and an adjacent, upper interior platform.

12. A station as claimed in claim 8; wherein each interior platform is wide enough in order to allow space for moving each wind turbine from an operating position, inwardly relative to one of the vertical frames to a servicing position on the interior platform in order to allow space on the platform at the servicing position for said wind turbine to be serviced; and to allow space on the platform between the servicing position and another one of the vertical frames for a roadway for a vehicle mounted crane to travel between service positions and to have access to each turbine on the platform at its operating position.

13. A station as claimed in claim 8; wherein each interior platform has a first vehicle ramp on a roadway leading to an adjacent upper interior platform and a second vehicle ramp on a roadway leading to an adjacent lower interior platform.

14. A station as claimed in claim 8 wherein the wind turbines can be horizontal axis wind turbines; vertical axis wind turbines; or a combination of horizontal axis and vertical axis wind turbines.

15. A station as claimed in claim 8 or claim 1 wherein the wind turbines, each having a height slightly less than the distance between vertically spaced horizontal interior platforms.

16. A station as defined in claim 8, wherein hydrogen based electricity generation units are located on the multi floor structure, each unit comprising electrolyzers which are fed by electricity generated by said wind turbines, the electricity being converted to DC and transformed to proper low voltage and adequate amperage for the electrolyzers, and the electrolyzers producing hydrogen which is stored in hydrogen tanks, and the hydrogens tanks are in communication with hydrogen operated fuel cell generators which generate non-fluctuating electricity.

17. A station as claimed in claim 1 or claim 8; wherein locking means are associated with each wind turbine and said track means for locking the turbine on the track means in the operating position against movement from the operating position.

18. An array of stations; wherein each station is as constructed as claimed in claim 1, and wherein extremities of exterior frames of the stations in the array are located on a perimeter of a virtual open or closed curve, wherein first and last exterior frames located on the virtual open curves and first and last interior frames located on parallel correspondent virtual curves, are supported by tension cables to fix the frames to ground.

19. A wind turbine station comprising an annular, multi floor structure having a generally cylindrical or polygonal prism outer frame and at least another generally cylindrical or polygonal prism inner frame which is concentric within the outer frame, both frames each made of beams and columns to provide an open framing construction and interconnected to each other by beams to form one spatial structure; a plurality of vertically spaced horizontal interior platforms between the outer and inner frames and forming the floors of the structure, each interior platform having a flat, ring shape and fastened to both the outer and inner frames to extend across a space between the frames; and wind turbines mounted on the structure about the outer periphery of each interior platform, the wind turbines facing outwardly, and wherein each wind turbine is operatively connected to a generator to produce electricity.

20. A station as claimed in claim 19; wherein the height of the structure is about four times as large as the outside diameter of the structure.

21. A station as claimed in claim 19 wherein the outside diameter of the building is between 100-500 m. which is approximately one quarter the height of the station.

22. A method of building a wind turbine station of the type claimed in claim 1, claim 8 or claim 19 comprising building the frames of the station up, out of beams and columns, to a first floor level of the station using vehicle mounted cranes traveling on a ground floor, building at least part of the interior platforms forming the first floor, supported by the first floor frames, using the vehicle mounted cranes on the ground floor, including building a ramp up to the first floor from the ground floor; moving building material and wind turbines from the ground floor up to the first floor with the vehicle mounted cranes using the ramp; using the vehicle mounted cranes on the first floor to complete building the interior platforms of the first floor; building the frames up to a second floor level using the vehicle mounted cranes on the first floor; building part of the interior platforms of the second floor using the vehicle mounted cranes on the first floor, including building a ramp leading up from the first floor to the second floor; installing the wind turbines on the outer peripheries of the first floor interior platforms, and repeating the process to build each floor until the desired building height is reached.

23. A method as claimed in claim 22 including building at least one elevator large enough to carry construction materials and to carry the wind turbines during construction of the station, wherein the elevator is built in stages up from one floor to a next, adjacent to inner frames, and after building of frames of one floor in order to lift the required construction materials required to build the next floor and to lift the wind turbines.

* * * * *